United States Patent [19]

Ohta et al.

[11] Patent Number: 5,025,261
[45] Date of Patent: Jun. 18, 1991

[54] MOBILE OBJECT NAVIGATION SYSTEM

[75] Inventors: Tomozo Ohta, Ikoma; Hiroshi Nakano; Masao Miyazaki, both of Nara, all of Japan

[73] Assignee: Sharp Kabushiki Kaisha, Osaka, Japan

[21] Appl. No.: 464,141

[22] Filed: Jan. 16, 1990

[30] Foreign Application Priority Data

Jan. 18, 1989 [JP] Japan ................................. 1-10837
Feb. 6, 1989 [JP] Japan ................................. 1-26875

[51] Int. Cl.⁵ .......................... H04B 7/185; G01S 5/02
[52] U.S. Cl. ................................................. 342/357
[58] Field of Search ............... 342/357, 457, 191, 179, 342/452, 455

[56] References Cited

U.S. PATENT DOCUMENTS 4,918,609 4/1990 Yamawaki ........................... 342/357

Primary Examiner—Theodore M. Blum
Attorney, Agent, or Firm—David G. Conlin; Robert M. Asher

[57] ABSTRACT

A mobile navigation system using a communication system between at least one mobile object and a key station. The navigation system includes a unit mounted on the mobile object for determining the position of the mobile object, and a unit mounted on the mobile object for transmitting data representative of the determined position to the key station via the communication system. The navigation system further includes a data base unit mounted in the key station for storing map data, a unit mounted in the key station for deriving map data of an area including the position of the mobile object from the data base unit, in response to the transmitted position data, a unit mounted in the key station for transmitting data including the derived map data to the mobile object via the communication system, and a unit mounted on the mobile object for displaying a composite image composed of the position data of the mobile object and the map data, in response to the transmitted data from the key station.

8 Claims, 9 Drawing Sheets

MOBILE OBJECT NAVIGATION SYSTEM

BACKGROUND OF THE INVENTION

1. Field of the Invention

The present invention relates to a navigation system capable of displaying positions of mobile objects on a map by using a mobile communication system consisting of mobile objects and a key station.

2. Description of the Related Art

In recent years, data communication technology has been remarkably advanced. With the advancement, a new navigation system has been developed and proposed. With the assist of this navigation system, mobile objects, such as vehicles, vessels, and aircrafts, when traveling, can check their present positions and travels toward and exactly reach their destined places.

A GPS (Global Positioning System) has been known as a system to determine the present positions of mobile objects with a high precision. Reference may be had to U.S. Pat. No. 4,114,155 and the references cited therein, and to ELECTRONICS, issued by Ohm Ltd., December, 1984.

A plurality of artificial satellites are used so that at least four satellites may constantly be observed from the earth. Each mobile object carries a GPS receiver which is for receiving and demodulating a microwave carrying a meaningful signal from each satellite. Through the modulation, the receiver detects orbiting data of the satellite that is contained in the received microwave signal having frequency of about 1 to 2 GHz. The present position of each satellite is obtained by applying the detected orbit data to Kepler's equation and solving the equation. A distance from one mobile object on the ground and each satellite can be obtained by measuring a propagation time of the signal transmitted from each satellite. To work out the present position of the mobile object, the simultaneous equations are solved for the present positions of the satellites and the distances between of the mobile object and the respective satellites.

In the mobile navigation system as applicants of the present patent application know, the GPS receiver, a data base unit storing map data, an image processing unit, and a display unit are all assembled into each navigation apparatus carried on each mobile object.

The position data of a mobile object derived from the GPS receiver and the map data derived from the map data base unit are composed by the image processing unit. The image processing unit produces composite image data representative of an image in which a position of the mobile object is traced on a map. The display unit receives the image data and visually presents such an image on its display screen.

Such a mobile object navigation system is advantageous in that so long as the GPS operates, an operator, e.g., a driver, may always recognize the present position of the mobile object per se, but is disadvantageous in that the expensive map data base unit has to be mounted for each mobile object. Especially, when the mobile object travels in a wide area, since a tremendous amount of map data is required, a great volume data base unit has to be equipped for every mobile. Furthermore, since landform and roads change day by day, the map data must be frequently updated to guarantee exact travelings. Also, it is very difficult or impractical to frequently update the data base unit installed in the mobile object.

SUMMARY OF THE INVENTION

It is therefore an object of the present invention to provide a mobile object navigation system which can provide a simple navigation apparatus installed in each mobile object.

Another object of the present invention is to provide a mobile object navigation system which readily realizes high performances.

The above objects can be achieved by a mobile navigation system employing a communication system between at least one mobile object and a key station. The navigation system has a unit mounted on the mobile object for determining the position of the mobile object, a unit mounted on the mobile object for transmitting data representing the determined position to the key station via the communication system, a data base unit mounted in the key station for storing map data, a unit mounted in the key station, responsive to the position data of the mobile object, for deriving map data of an area including the position of the mobile object from the data base unit, a unit mounted in the key station for transmitting the data in connection with the derived map data to the mobile object, and a unit mounted on the mobile object, responsive to the data transmitted from the key station, for displaying a composite image as a visual presentation of the data composed of the position data and the map data.

In the mobile navigation system thus arranged, it is noted that the map data base unit is provided in the key station, and is accessible to a plurality of mobile objects.

Preferably, an image processing unit for forming a composite image based on the map data transmitted from the key station and the position data, may be provided in the mobile object.

An image processing unit for forming a composite image based on the map data derived in the key station and the position data from the mobile object may be provided in the key station.

The key station is preferably a radio station at a fixed location.

Further objects and advantages of the present invention will be apparent from the following description of the preferred embodiments of the invention as illustrated in the accompanying drawings.

BRIEF DESCRIPTION OF THE DRAWINGS

FIG. 2 which is combined by FIGS. 2a and 2b shows electrical configurations of navigation apparatuses used in the embodiment of FIG. 1;

FIG. 3 which is combined by FIGS. 3a and 3b is a flow chart useful in explaining an operation of the embodiment of FIG. 1;

FIG. 5 which is combined by FIGS. 5a and 5b shows electrical configurations of navigation apparatuses used in another embodiment of the present invention; and FIG. 6 which is combined by FIGS. 6a and 6b is a flow chart useful in explaining an operation of the embodiment of FIG. 5.

DETAILED DESCRIPTION OF THE PREFERRED EMBODIMENTS

Figure 1:
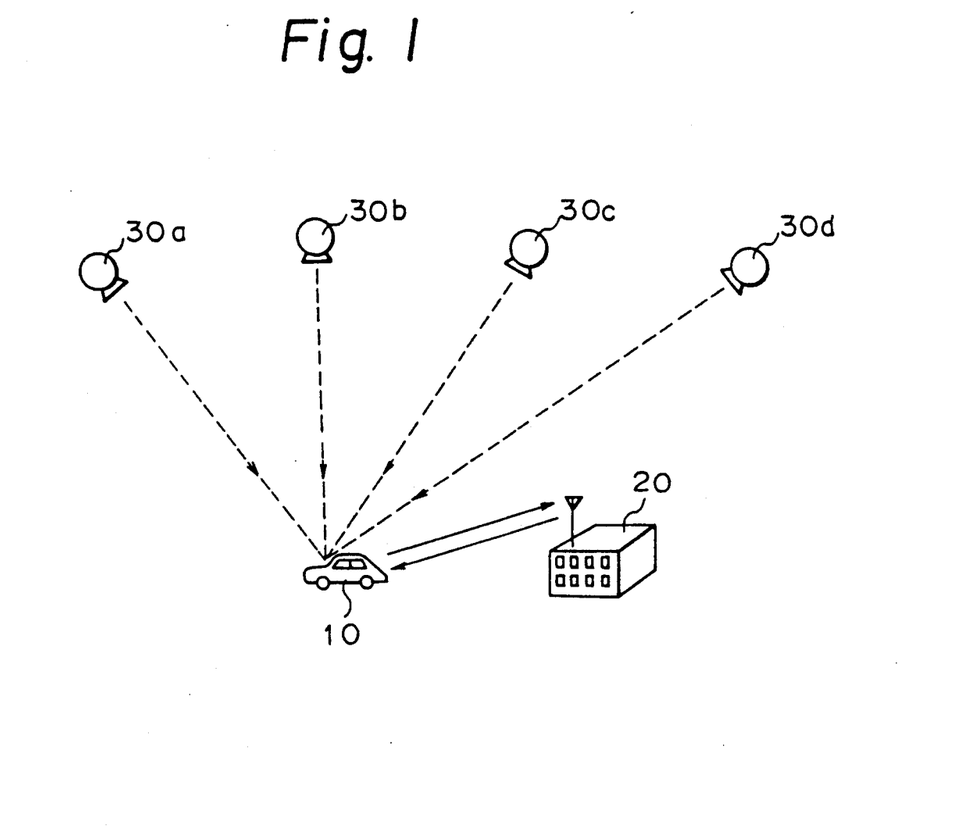
FIG. 1 is a schematic illustration of an embodiment of a mobile object navigation system according to the present invention.

FIG. 1 schematically illustrates a navigation system in use with vehicles as a preferred embodiment of a mobile object navigation system according to the present invention.

In the figure, reference numeral 10 designates a vehicle such as an automobile, 20 a key station as a radio station at a fixed location, 30a, 30b, 30c, and 30d GPS artificial satellites.

A navigation apparatus installed in the vehicle 10 receives microwaves transmitted from the satellites 30a to 30d, and acquired data representative of the present position of the vehicle 10. The vehicle 10 transmits the position data to the key station 20 by using a radio wave in a frequency band of an HF (High Frequency), VHF (Very High Frequency) or UHF (Ultra High Frequency). The key station 20 transmits the map data of an area in connection with the position data as received by using a radio wave of the HF, VHF or UHF. The vehicle 10 receives the map data and displays an image of a map on which the position of the vehicle is traced by using the received map data and the position data.

Figures 2, 2A:
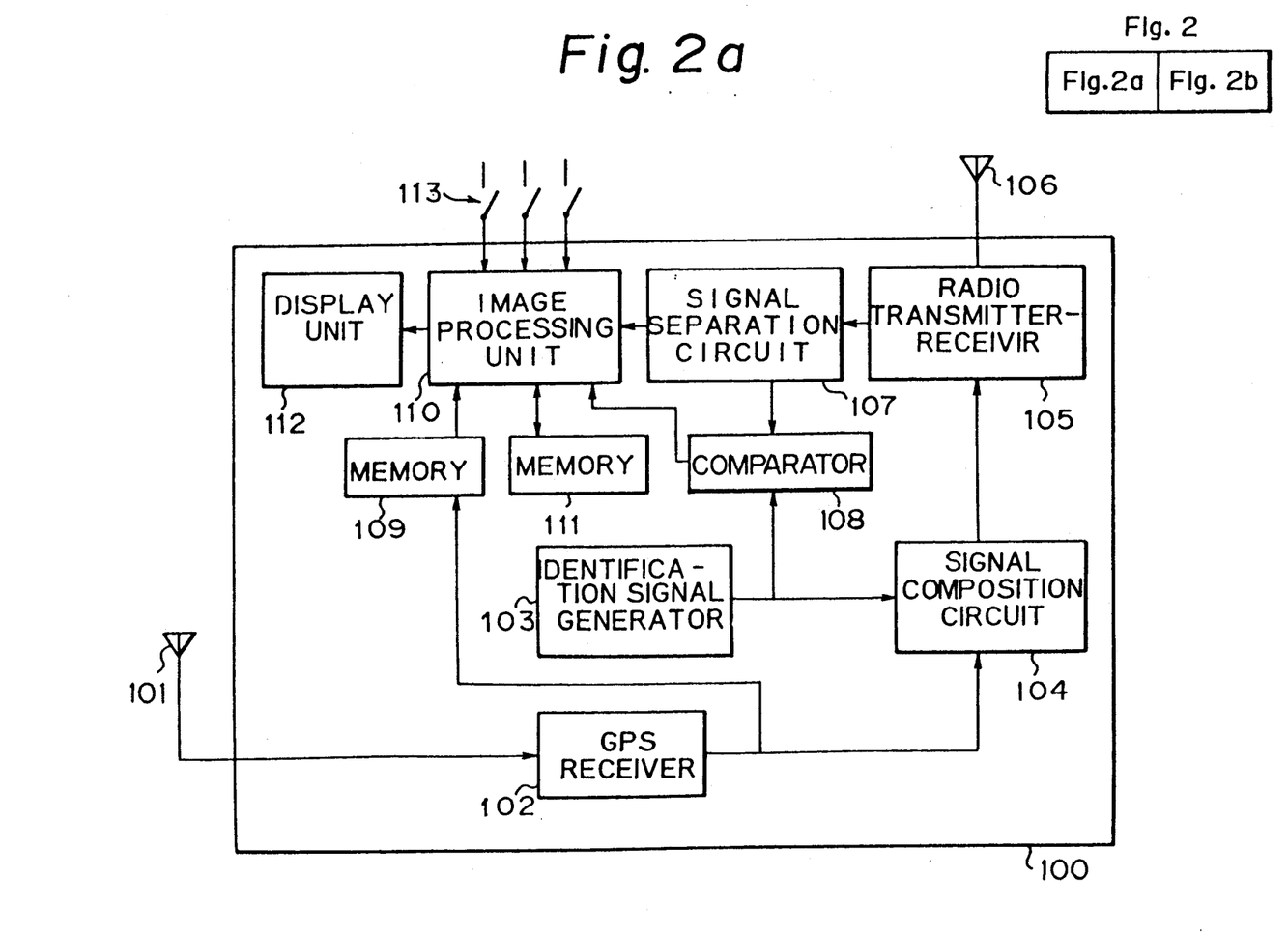
Figure 2B:
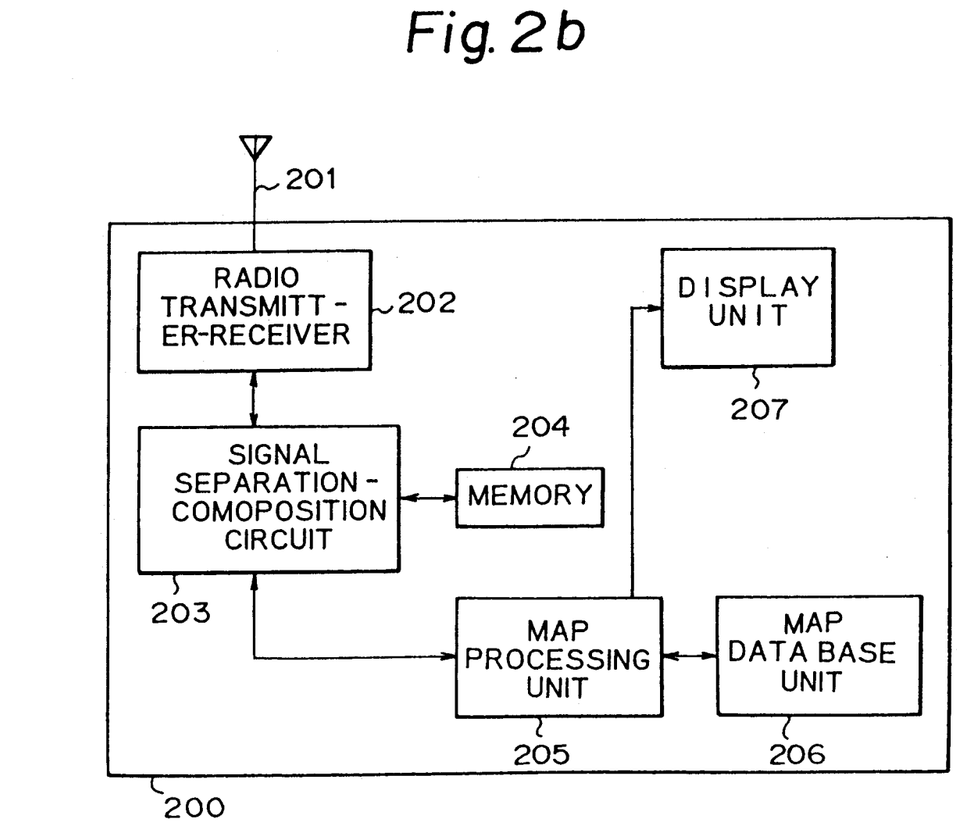

FIG. 2 shows an electrical configuration of the navigation apparatus used in the vehicle navigation system of FIG. 1.

In the figure, reference numeral 100 designates a navigation apparatus installed in the vehicle 10, and 200 a navigation apparatus installed in the key station 20.

The navigation apparatus 100 is provided with a GPS antenna 101 and a GPS receiver 102 coupled with the antenna 101.

The receiver 102 generates the position data representing the present position of the vehicle 10 by using the orbit data transmitted from the satellites 30a to 30d (shown in FIG. 1). Details of the GPS receiver 102 is described in U.S. Pat. No. 4,114,155 and documents cited therein.

An identification (ID) signal generator circuit 103 contains a semiconductor ROM (Read Only Memory) storing an ID code identifying the vehicles itself, and a read-out circuit associated with the ROM. The ID code consists of the number of bits that depends on the number of subscribers in this navigation system.

A signal composition circuit 104 is coupled with the receiver 102 and the ID signal generator 103, and composes the position data and the ID code. The circuit 104 is coupled with a radio transmitter-receiver 105 capable of transmitting a radio wave in any of HF, VHF and UHF bands. The transmitter-receiver 105 is coupled with an antenna 106.

A signal separation circuit 107, coupled with the transmitter-receiver 105, receives a signal from the circuit 105 and separates it into a map data signal and a ID code signal.

A comparator 108, coupled with the signal separation circuit 107 and the ID signal generator circuit 103, compares the ID code signal as separated with a signal containing an ID code assigned to the vehicle itself.

A memory 109, which consists of a RAM (Random Access Memory), for example, is coupled with the GPS receiver 102 stores the position data representing the present position of the vehicle 10, that is derived from the GPS receiver 102.

An image processing unit 110 is coupled with the signal separation circuit 107, comparator 108, memory 109, a memory 111 for storing map data as a RAM, for example, a display unit 112, and a key switch 113. The image processing unit 110 includes mainly a microcomputer, and composes the map data derived from the key station 20 and the position data representing the present position of the vehicle 10, that is derived from the memory 109, to form composite image data.

The display unit 112 includes mainly a cathode ray tube, a liquid crystal display, electroluminescent display or a plasma display panel, and visually presents the composite image data.

Key switches 113 are manually operated when an operator desires to correct an image displayed by the display unit 112.

While the ID signal generator circuit 103 is discretely provided in this instance, the ID code signal assigned to the vehicle may be generated in the transmitter-receiver 105 or the image processing unit 110.

The transmitter-receiver 105 may be any of an automobile telephone, portable telephone, transmitter-receiver of the MCA (Multi Channel Access) type, personal radio transmitter-receiver, and mobile terminal equipment, e.g., a data terminal device in a teleterminal system. Where the transmitter-receiver 105 consists of the mobile terminal equipment, a navigation system with high performances may be realized because of its additional functions.

The GPS receiver 102 may be substituted by a receiver based on another scheme for determining the present position of the vehicle 10. A receiver adaptable for various types of position determining systems, as disclosed in U.S. Pat. No. 4,359,733 or a receiver for a sign-post system. In the sign-post system, a plurality of position signal transmitters are located in a service area, and when a vehicle travels and is near any of those transmitters, the vehicle receives a position signal from the transmitter to determine the present position thereof.

The navigation apparatus 200 in the key station is provided with an antenna 201, and a radio transmitter-receiver 202, which is operable in HF, VHF or UHF band and is coupled with the antenna 201.

A signal separation-composition circuit 203 is coupled with a radio transmitter-receiver 202, and receives a signal from the transmitter-receiver 202 and separates it into a position data signal and an ID code signal. The circuit 203 is connected to a memory 204 such as a RAM for storing the ID code, and a a map processing unit 205. The separated ID code signal is stored in the memory 204, and the separated position data is applied to the map processing unit 205. The circuit 203 composes the map data derived from the map processing unit 205 and the ID code signal from the memory 204.

The map processing unit 205 is connected to a map data base unit 206 and a display unit 207 for monitoring signals in the map processing unit 205. The map processing unit 205 includes a microcomputer as a main component. The unit 205 is responsive to the position data from the signal separation-composition circuit 203 to derive necessary map data from the map data base unit 206.

The map data base unit 206 may be a memory device made up of a CD (Compact Disc) - ROM and its player. Accordingly, the map data stored therein may readily be updated in accordance with changes of landform and roads, and the data base unit 206 may provide the up-to-date map data.

The display unit 206 includes mainly a cathode ray tube, a liquid crystal display, electroluminescent display or a plasma display panel, and visually presents the composite image data.

Figure 3A:
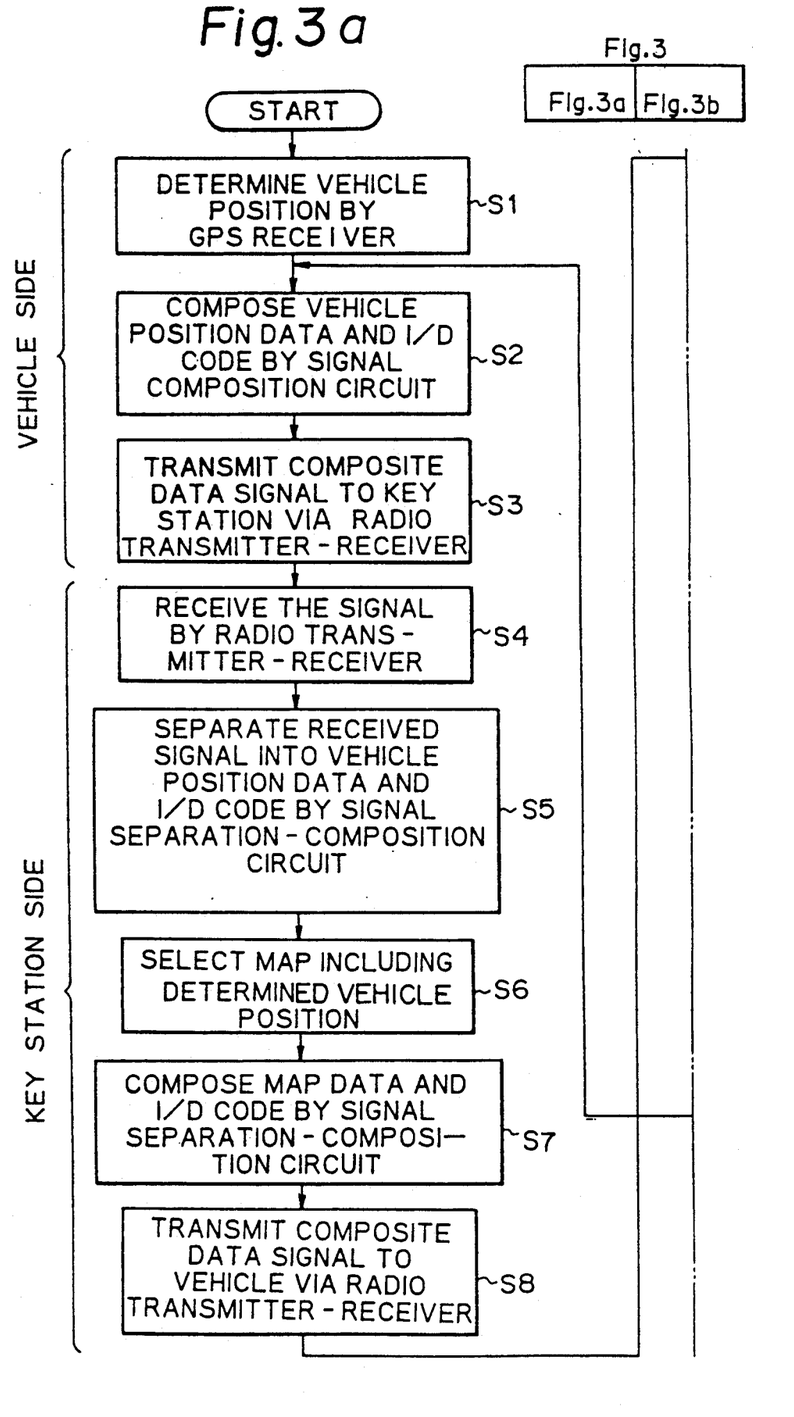
Figure 3B:
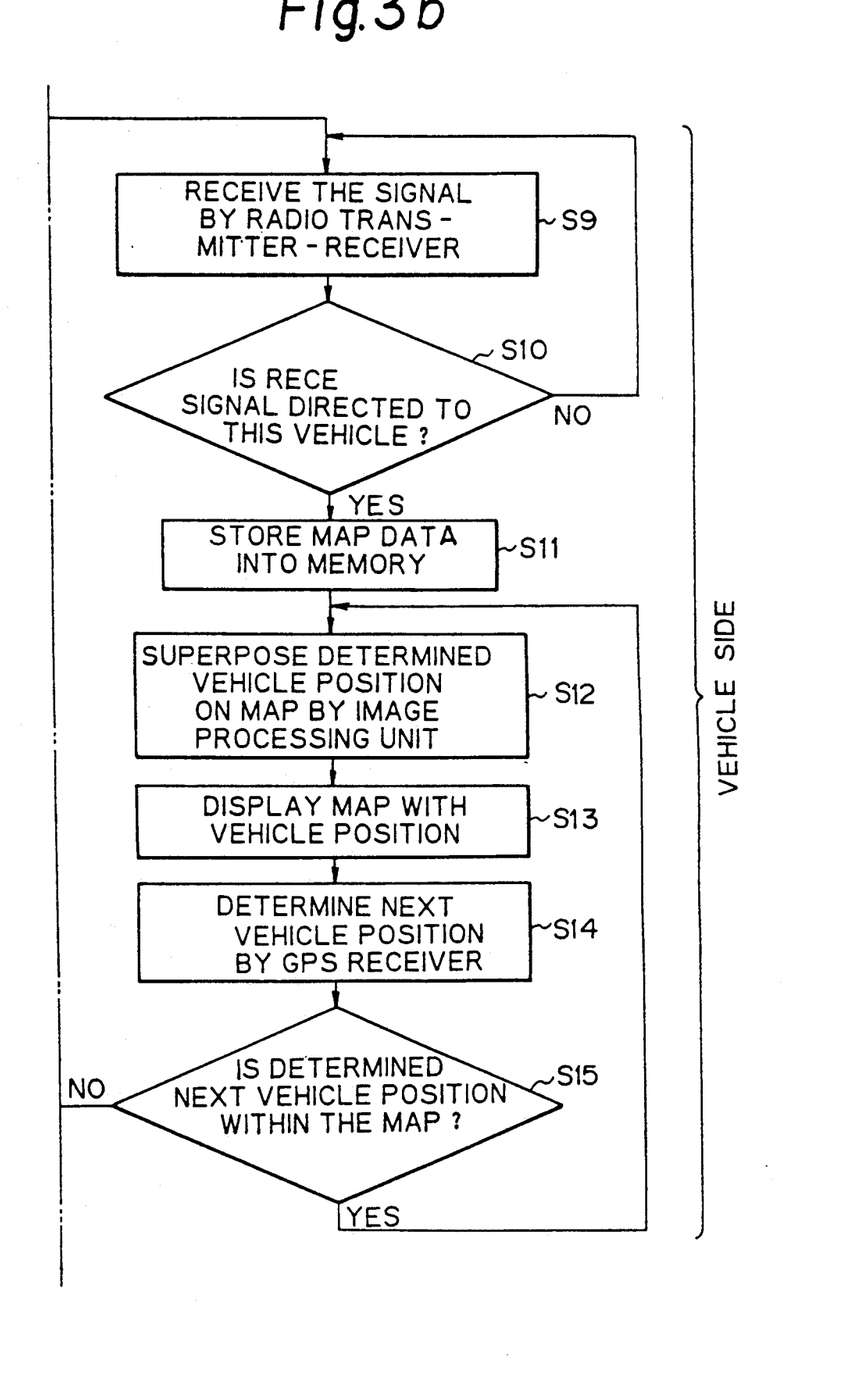

The operation of the vehicle navigation system thus arranged will be described with reference to FIG. 3 showing a flow chart.

A following sequence of processings are, at first, performed in the navigation apparatus 100 of the vehicle.

At step S1, the signals transmitted from the satellites 30a to 30d (FIG. 1) are caught by the GPS antenna 101, and the GPS receiver 102 determines the present position of the vehicle which carries this navigation apparatus 100. The GPS receiver 102 produces the position data including the latitude, longitude and height of the vehicle 10 and speed data based on a rate of change of the position data.

The latitude data is presented as 032° 26.67N, for example, and the longitude data, as 118° 29.99W, for example. To express those figures in the binary system, 4 bits are used for each figure, and 2 bits, for each of the latitude and the longitude. Accordingly, a total of bits for expressing the latitude data or the longitude data is (4 bits×7 figures+2 bits)×2=60 bits.

At next step S2, the signal composition circuit 104 composes the determined position data and also the speed data, and into the ID code uniquely assigned to the vehicle. Incidentally, the determined position data and the speed data are stored into the memory 109.

Figure 4A:
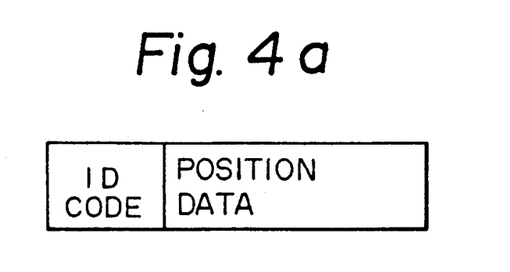
FIGS. 4a and 4b show formats of a composite signal used in the embodiment of FIG. 1.
Figure 4B:
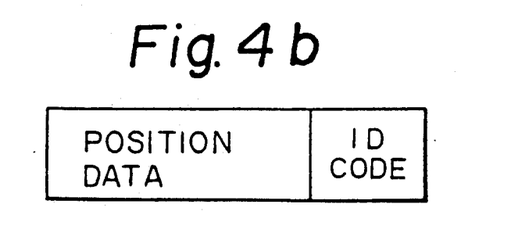

The composite data signal may be formatted as shown in FIG. 4a in which the ID code is followed by the position data or as shown in FIG. 4b in which the position data is followed by the ID code.

In case where the ratio transiver-receiver 105 like an automobile telephone has a phone number uniquely assigned, the phone number may be used as the ID code.

The transiver-receiver 105 transmits the composite data signal through the antenna 106 by carrying it on a radio wave of 800 to 900 MHz (at step S3).

In the navigation apparatus 200 of the key station, the transmitter-receiver 202 receives the radio wave containing the composite data signal from the vehicle 10, through the antenna 201, and demodulates it (at step S4).

The signal separation-composition circuit 203 separates the demodulated signal into the position data and the speed signal, and into the ID code. The ID code is stored into the memory 204. The position data (latitude and longitude data) and the speed data are applied to the image processing unit 205 (at step S5).

Receiving the position data and the ID code, the image processing unit 205 accesses the map data base unit 206 to derive data of a map containing the vehicle position indicated by the position data (at step S6). More specifically, the derived map data is data of a map containing the vehicle position at the center, for example, the map data of a map of 10 km×10 km containing the present position of the vehicle 10 at the center.

In this case, the derived map data may be selected such that an area expanding in the forward direction of the vehicle 10 is larger than the area in the backward direction thereof. The reduced scale of the map may be varied in accordance with the speed data.

The map data thus obtained is applied to the signal separation-composition circuit 203, which adds the ID code to the map data received (at step S7). Then, it is transmitted from the transmitter-receiver 202 to the vehicle 10 (at step S8).

In the navigation apparatus of the vehicle 10, the transmitter-receiver 105 receives a radio wave carrying the map data with the ID code from the key station, through the antenna 106, and demodulates the wave (at step S9).

The signal separation circuit 107 separates the demodulated signal into the map data signal and the ID code signal. The ID code signal is applied to the comparator 108. The comparator 108 compares the ID code data derived from the ID signal generator circuit 103 with the received and separated ID code signal, to check as to whether or not the map data received is directed to the vehicle per se (at step S10).

If it is directed to this vehicle, the image processing unit 110 stores the received map data into the memory 111 (at step S11).

The unit 110 composes the position data representing the present position of the vehicle 10 that is derived from the memory 109, and the received map data, thereby to form a composite image data signal (at step S12). The composite image data signal is transferred to the display unit 112 and displayed thereby as visual image (at step S13).

The position data derived from the GPS receiver generally presents a geometrical position. To superpose the vehicle position of the position data on the map of the map data, the position data may be subjected to the coordinate transformation.

After the next position of the vehicle 10 is determined in the GPS receiver 102 (at step 14), the image processing unit 110 checks whether or not the determined position is within an area of the map data that was previously transmitted from the key station 20 and stored in the memory 111 (at step S15).

The map data transmitted from the key station 20 to the vehicle 10 contains the map data covering a satisfactorily large area. Accordingly, there is no need for transmitting another image data from the key station to the vehicle, so long as the present vehicle position is within the area. In other words, the map data previously received is continuously available.

Thus, when the present vehicle position is within the area of the map data previously received, control goes to step S12 where it traces the position on the same map. Only when the vehicle position is outside the map data area, control returns to step S2.

By manually operating the key switches 113, a map image displayed on the display screen of the display unit 205 may be subjected to an appropriate image processing, such as enlargement, reduction, and rotation.

In the navigation apparatus 200 of the key station, various types of managements of vehicle service are possible by displaying information in the map processing unit 205 on the display screen of the display unit 207. Further, the present positions of a plurality of vehicles may be concurrently displayed, with different ID codes respectively assigned to those vehicles. The positions of those vehicles may be simultaneously displayed on the display unit 112 of each vehicle.

If required, the key station may be a specific one of those mobile stations or vehicles, not the radio station at a fixed location.

Figures 5, 5A:
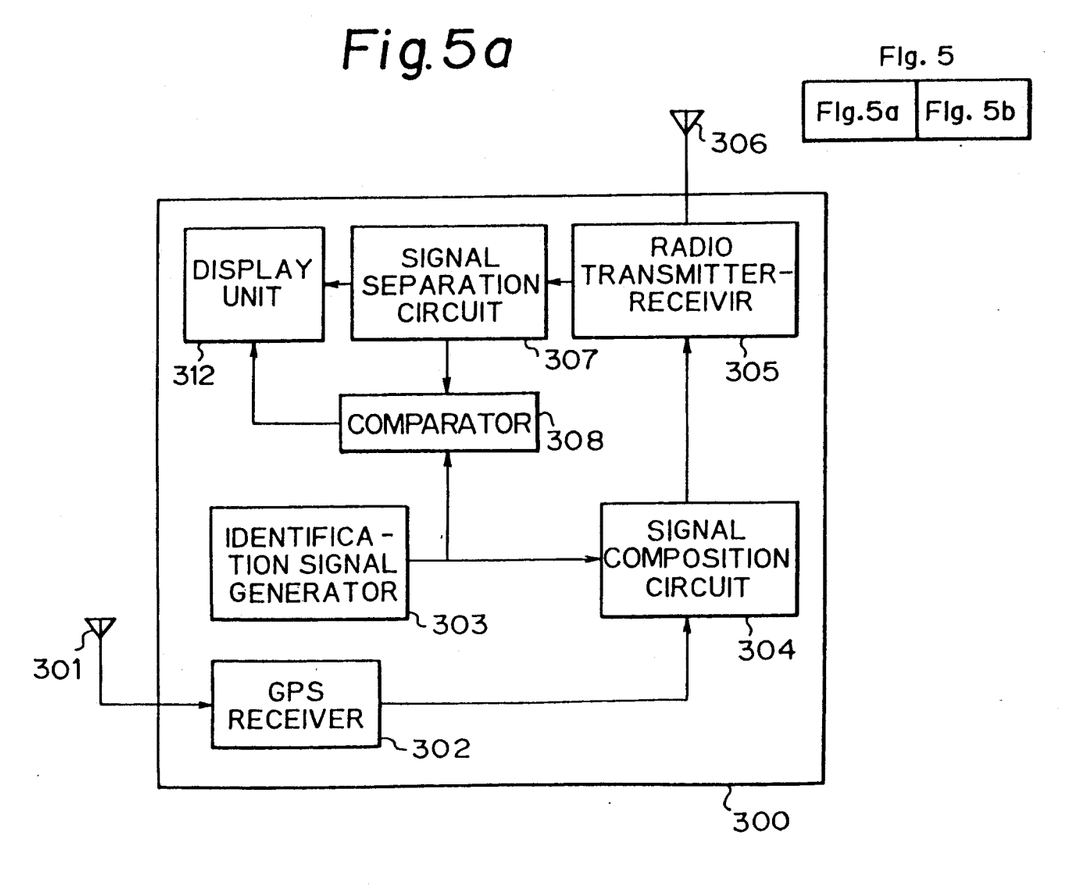
Figure 5B:
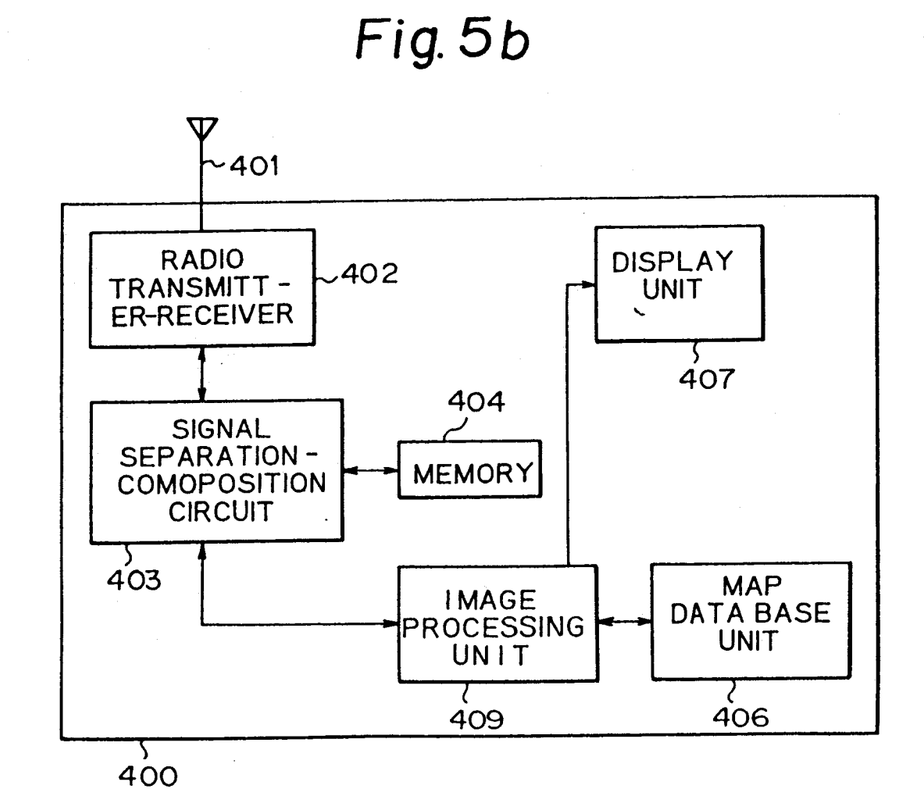

FIG. 5 shows an electrical configuration of a navigation apparatus used in a navigation system according to another embodiment of the present invention.

The position data is transmitted from the vehicle 10 to the key station 20 by means of a radio wave in any of the HF, VHF and UHF bands. In this embodiment, the key station 20 composes the position data received and the map data of an area containing the vehicle position to form image data representing such a map that the vehicle position is o a map. The image data thus formed is transmitted to the vehicle 10 by a radio wave of the HF, VHF or UHF. The vehicle 10 displays a map image represented by the image data received.

In FIG. 5, reference numeral 300 designates a navigation apparatus installed in the vehicle 10, 400 a navigation apparatus installed in the key station 20.

The navigation apparatus 300 is provided with a GPS antenna 301 and a GPS receiver 302 coupled with the antenna 301.

The receiver 302 generates the position data representing the present position of the vehicle 10 by using the orbit data transmitted from the satellites.

An ID signal generator circuit 303 contains a semiconductor ROM storing an ID code uniquely assigned to the vehicle per se, and a read-out circuit associated with the ROM.

A signal composition circuit 304 is coupled with the receiver 302 and the ID signal generator 303, and composes the position data and the ID code. The circuit 104 is coupled with a radio transmitter-receiver 105 capable of transmitting a radio wave in any of HF, VHF and UHF bands. The transmitter-receiver 305 is coupled with an antenna 306.

A signal separation circuit 307, coupled with the transmitter-receiver 305, receives a signal from the circuit 305 and separates it into a map data signal and a ID code signal.

A comparator 308, coupled with the signal separation circuit 307 and the ID signal generator circuit 303, compares the ID code signal as separated with a signal containing an ID code assigned to the vehicle per se.

A display unit 312 is coupled with the signal separation circuit 307 and the comparator 308, and visually presents the image data from the key station. The display unit includes mainly a cathode ray tube, a liquid crystal display, electroluminescent display or a plasma display panel.

The radio transmitter-receiver 305 may be any of an automobile telephone, portable telephone, transmitter-receiver of the MCA type, personal radio transmitter-receiver, and mobile terminal equipment, e.g., a data terminal device in a teleterminal system. Where the transmitter-receiver 305 consists of the mobile terminal equipment, a navigation system with high performances may be realized because of its additional functions.

The GPS receiver 302 may be substituted by a receiver based on another scheme for determining the present position of the vehicle 10. A receiver adaptable for various types of position determining systems, as disclosed in U.S. Pat. No. 4,359,733 or a receiver for a sign-post system. In the sign-post system, a plurality of position signal transmitters are located in a service area, and when a vehicle travels and is near any of those transmitters, the vehicle receives a position signal from the transmitter to determine the present position thereof.

The navigation apparatus 400 in the key station is provided with an antenna 401, and a radio transmitter-receiver 402, which is operable in HF, VHF or UHF band and is coupled with the antenna 401.

A signal separation-composition circuit 403 is coupled with a radio transmitter-receiver 402, and receives a signal from the transmitter-receiver 402 and separates it into a position data signal and an ID code signal. The circuit 403 is connected to a memory 404, such as a RAM, for storing the ID code, and an image processing unit 409. The separated ID code signal is stored in the memory 404, and the separated position data is applied to the map processing unit 409. The circuit 403 composes the map data derived from the map processing unit 409 and ID code signal from the memory 404.

The map processing unit 409 is connected to a map data base unit 406 and a display unit 407 for monitoring signals in the map processing unit 409. The map processing unit 409 includes a microcomputer as a main component. The unit 409 is responsive to the position data from the signal separation-composition circuit 403 to derive necessary map data from the map data base unit 406.

The image processing unit 409 may be a facsimile device, for example.

The map data base unit 406 is a memory device made up of a CD ROM and its player. Accordingly, the map data stored therein may readily be updated in accordance with changes of landform and roads, and the data base unit 206 ma provide the up-to-date map data.

The display unit 407 includes mainly a cathode ray tube, a liquid crystal display, electroluminescent display or a plasma display panel.

Figures 6, 6A:
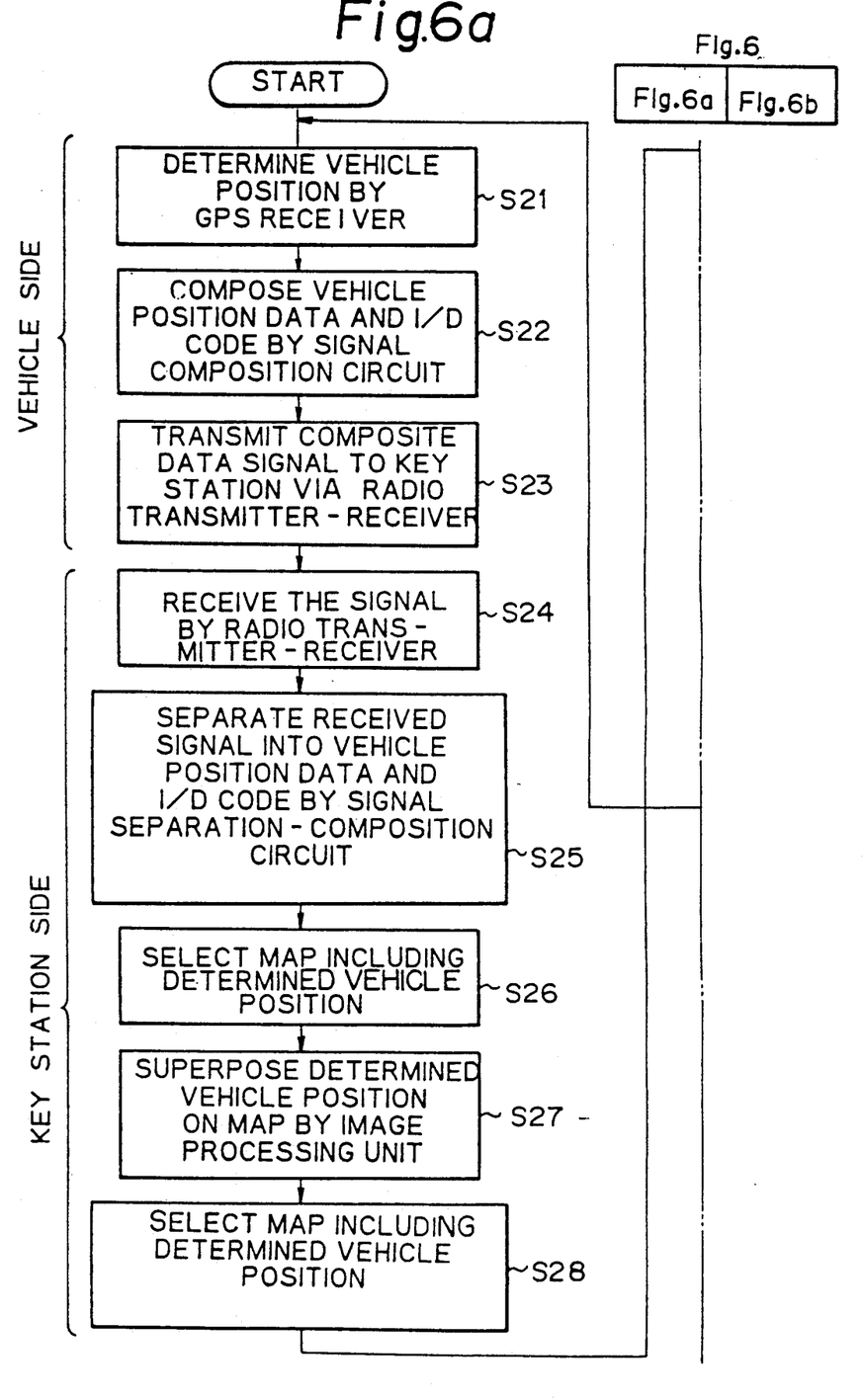
Figure 6B:
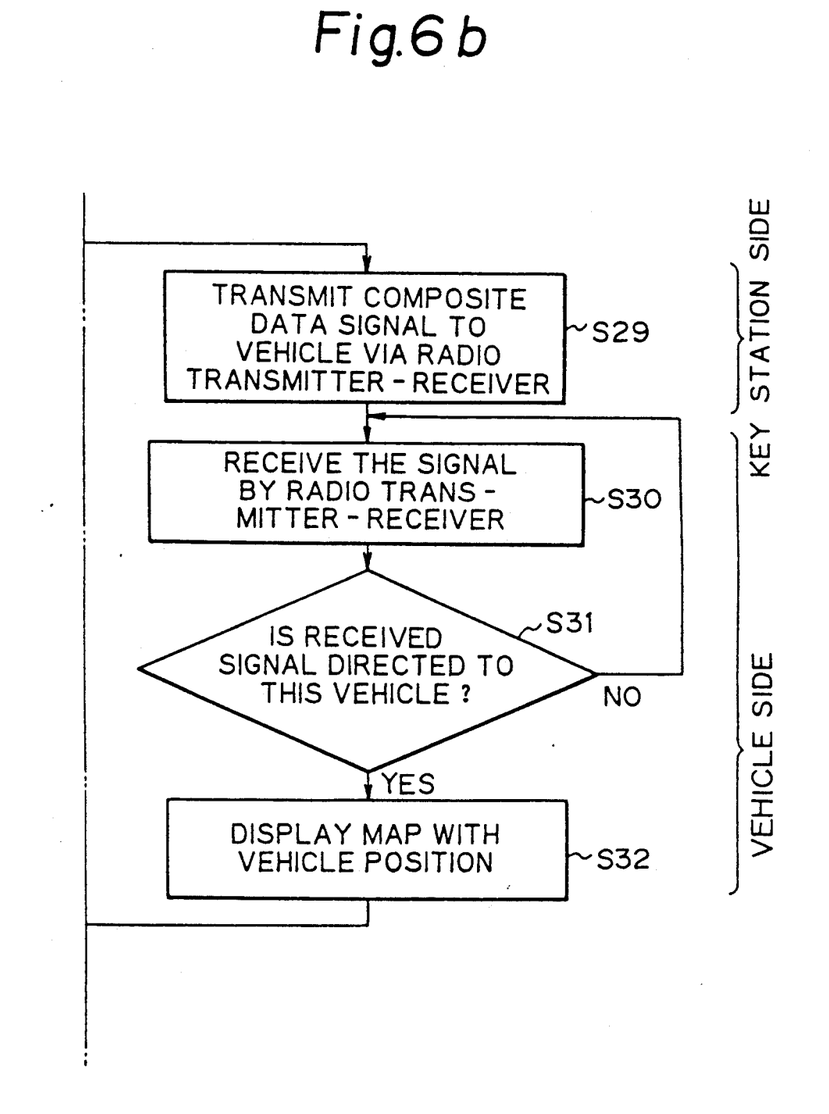

FIG. 6 is a flow chart showing the operation of the vehicle navigation system of FIG. 5.

A sequence of processings from steps S21 to S23 of FIG. 6, that is performed in the navigation apparatus 300, is the same as the processings from steps S1 to S3 shown in FIG. 3.

In the navigation apparatus 400 of the key station, the transmitter-receiver 402 receives the radio wave containing the composite data signal from the vehicle 10, through the antenna 401, and demodulates the received wave (at step S24).

The signal separation-composition circuit 403 separates the demodulated signal into the position data and also the speed signal, and into the ID code. The ID code is stored into the memory 404. The position data (latitude and longitude data) and the speed data are applied to the image processing unit 409 (at step S25).

When receiving the position data and the ID code, the image processing unit 409 makes an access to the map data base unit 406, and derives data of a map containing the vehicle position indicated by the position data (at step S26). More specifically, the derived map data is data of a map containing the vehicle position at the center.

In this case, the derived map data may be selected such that an area expanding in the forward direction of the vehicle 10 is larger than the area in the backward direction thereof. The reduced scale of the map may be varied in accordance with the speed data.

The image processing unit 409 composes the position data on the derived map data to form composite image data (at step S27).

The position data derived from the GPS receiver generally presents a geometrical position. To superpose the vehicle position of the position data on the map of the map data, the position data may be subjected to the coordinate transformation.

The signal separation-composition circuit 403 adds the ID code derived from the memory 403 to the composite image data (at step S28), and transmits it to the vehicle via the transmitter-receiver 402 (at step S29).

The processings by the vehicle navigation apparatus 300 at steps S30 to S32 are the same as those in steps S9, S10, and S13 in FIG. 3.

After the display processing by the display unit 312 at step S32 is completed, control returns to step S21. The sequence of processings for the next position of the vehicle is repeated.

Many widely different embodiments of the present invention may be constructed without departing from the spirit and scope of the present invention. It should be understood that the present invention is not limited to the specific embodiments described in the specifications except as defined in the appended claims.

What is claimed is:

1. A mobile navigation system using a communication system between at least one mobile object and a key station, comprising:

means, mounted on the mobile object, for determining the position of the mobile object;

means, mounted on the mobile object, for transmitting data representative of the determined position to the key station via the communication system;

a data base unit, mounted in the key station, for storing map data;

means, mounted in the key station, responsive to the transmitted position data for deriving from the data base unit map data of an area that includes the position of the mobile object;

means, mounted in the key station, for transmitting data including the derived map data to the mobile object via the communication system; and means, mounted on the mobile object, for displaying a composite image composed of the position data of the mobile object and the map data, in response to the transmitted data from the key station.

2. A mobile navigation system as claimed in claim 1, wherein the system further comprises an image processing means, mounted on the mobile object, for forming the composite image based on the map data transmitted from the key station and the position data of the mobile object.

3. A mobile navigation system as claimed in claim 1, wherein the system further comprises an image processing means, mounted in the key station, for forming the composite image based on the map data from the deriving means in the key station and the position data transmitted from the mobile object, said formed composite image being transmitted to the mobile object via the communication system.

4. A mobile navigation system as claimed in claim 1, wherein the system further comprises means, mounted on the mobile object, for composing the position data and an identification code of the mobile object itself, and means, mounted on the mobile object, for separating the data transmitted from the key station into the map data and the identification code.

5. A mobile navigation system as claimed in claim 4, wherein the system further comprises means, mounted on the mobile object, for comparing the identification code separated by said means for separating with the identification code of the mobile object itself to check that the transmitted map data is directed to said mobile object.

6. A mobile navigation system as claimed in claim 1, wherein the system further comprises means, mounted in the key station, for separating the position data transmitted from the mobile object and the identification code, and for composing the map data derived from the deriving means and the identification code of the mobile object.

7. A mobile navigation system as claimed in claim 1, wherein said key station is a radio station at a fixed location.

8. A mobile navigation system as claimed in claim 1, wherein said determining means includes a plurality of artificial satellites and a GPS receiver for generating the position data representative of the position of the mobile object, by using orbit data transmitted from the satellites.

* * * * *